United States Patent [19]

Throckmorton et al.

[11]  4,418,185
[45]  Nov. 29, 1983

[54] PROCESS FOR NONAQUEOUS DISPERSION POLYMERIZATION OF BUTADIENE IN THE PRESENCE OF HIGH CIS-1,4-POLYISOPRENE AS A POLYMERIC DISPERSING AGENT

[75] Inventors: Morford C. Throckmorton, Akron; Paul H. Sandstrom, Tallmadge, both of Ohio

[73] Assignee: The Goodyear Tire & Rubber Company, Akron, Ohio

[21] Appl. No.: 419,649

[22] Filed: Sep. 20, 1982

[51] Int. Cl.$^3$ .............................................. C08F 2/08
[52] U.S. Cl. ................................................... 526/201
[58] Field of Search ............................. 526/201, 340.4

[56] References Cited

U.S. PATENT DOCUMENTS 4,098,980  7/1978  Markle ................................ 526/201

Primary Examiner—Paul R. Michl
Attorney, Agent, or Firm—Alvin T. Rockhill

[57] ABSTRACT

This invention reveals a process for the nonaqueous dispersion polymerization of butadiene monomer in a reaction mixture containing a liquid nonaqueous dispersion medium, the improvement which comprises carrying out the polymerization of the butadiene monomer in the presence of high cis-1,4-polyisoprene to produce very high cis-1,4-polybutadiene.

10 Claims, No Drawings

PROCESS FOR NONAQUEOUS DISPERSION POLYMERIZATION OF BUTADIENE IN THE PRESENCE OF HIGH CIS-1,4-POLYISOPRENE AS A POLYMERIC DISPERSING AGENT

BACKGROUND OF THE INVENTION

Many polymerization processes are used in the formation of synthetic polymers. For example, the polymerization of a polymer can be conducted in a number of different types of reaction systems, including bulk polymerization, suspension polymerization, emulsion polymerization, and solution polymerization. Each of these systems has certain advantages and disadvantages.

Bulk polymerization is the direct conversion of liquid monomers to polymer in a reaction system in which the polymer remains soluble in its own monomer. Such bulk polymerizations are generally carried out by the addition of an initiator to a simple homogeneous system containing one or more monomers. The synthesis of polystyrene by the addition of a free radical initiator to styrene monomer is a good example of a very common bulk polymerization. The principal advantage of a bulk polymerization process is that the product obtained can be used directly since it is essentially free of solvents and impurities. One disadvantage of bulk polymerization reactions is that it is difficult to control the reaction temperature during polymerization.

In suspension polymerization, the initiator is dissolved in the monomer, the monomer is dispersed in water, and a dispersing agent is incorporated to stabilize the suspension formed. All suspension polymerization processes use some type of surfactant to keep the monomer globules dispersed through the reaction in order to avoid coalescence and agglomeration of the polymer. Not only does the suspension stabilizer affect the particle size and shape, but also the clarity, transparency and film-forming properties of the resultant polymer. A variety of dispersing agents including water-insoluble, finely divided, inorganic materials and organic materials, depending upon the monomer to be polymerized, have been used as dispersing agents. Thus, for example, talc, barium, calcium and magnesium carbonates, silicates, phosphates and sulfates, as well as poly(vinyl alcohol), tragacanth gum, salts of styrenemaleic anhydride copolymers, vinyl acetate-maleic anhydride copolymers and their salts, starch, gelatin, pectin, alginates, methyl cellulose, carboxymethylcellulose, bentonite, limestone and alumina have been used as suspending agents. A major advantage of suspension polymerization is that the polymeric products are obtained in the form of small beads which are easily filtered, washed and dried. For reasons of cost and unreactivity water is a much more desirable diluent and heat-transfer medium than most organic solvents.

However, in certain polymerization processes, for example, the preparation of very high cis-1,4-polybutadiene, while utilizing nickel catalyst systems the presence of any moisture is highly undesirable. Thus, suspension polymerization in a water medium is not an effective process for the synthesis of very high cis-1,4-polybutadiene utilizing nickel catalyst systems.

An emulsion polymerization process is considered to be a three-phase reaction system consisting of large droplets of the monomer, the aqueous phase containing the dissolved initiator, and the colloidal particles of monomer-swollen polymer. While the emulsion polymerization process has the economic advantage of using water as the emulsion base, not all polymerization processes can tolerate the presence of water.

Such is the case with the polymerization of butadiene into very high cis-1,4-polybutadiene utilizing nickel catalyst systems.

In solution polymerization, an organic solvent is used which is capable of dissolving the monomer, the polymer and the polymerization catalyst or initiator. Inasmuch as the polymer is soluble in the organic solvent which is used, there is a tendency for the viscosity of the solution to increase as the molecular weight of the polymer increases. If this continues over a period of time, the solution becomes too viscous to handle in conventional polymerization reaction systems unless the solids content is limited to a low level. In commercial polymerization processes, it is desirable to obtain a polymerization mass which has a high concentration of solid polymer and, at the same time, comprises a material which is easy to handle and does not accumulate on the walls of the reaction vessel.

A process for the nonaqueous dispersion polymerization of butadiene monomer into a very high cis-1,4-polybutadiene would be very desirable. Such a nonaqueous dispersion polymerization process could offer several distinct advantages over other possible polymerization techniques, including improved heat transfer, higher polymer concentrations in the reaction medium, increased production capacity, and energy saving.

A process for the nonaqueous dispersion polymerization of butadiene monomer in a liquid nonaqueous dispersion medium, for instance, n-butane or n-pentane with a Zielger-Natta catalyst which utilizes a block copolymer dispersion stabilizer is described in U.S. Pat. No. 4,098,980 to Richard A. Markle and Richard G. Sinclair (assigned to The Goodyear Tire & Rubber Company). This reference is hereby incorporated by reference in its entirety. The block copolymer dispersion stabilizer utilized in U.S. Pat. No. 4,098,980 is a copolymer which contains at least two blocks of polymer linked by chemical valences, at least one block (A block) is soluble in liquid organic dispersion medium and at least another block (B block) is insoluble in the dispersion medium and the stabilizer acts to disperse the polybutadiene which is formed in the stabilizer's presence.

SUMMARY OF THE INVENTION

In accordance with the present invention, a process is provided for the nonaqueous dispersion polymerization of butadiene monomer in a liquid nonaqueous dispersion medium utilizing a homopolymer as the dispersion stabilizer (dispersing agent). The homopolymer that is utilized in this invention as the dispersing agent is high cis-1,4-polyisoprene. By high cis-1,4-polyisoprene we mean those polyisoprenes in which at least 70% of the isoprene units in the polymer have the cis-1,4-isomeric structure.

The butadiene monomer is polymerized to very high cis-1,4-polybutadiene (95% or more cis-1,4-isomeric butadiene units) in a nonaqueous medium in which the very high cis-1,4-polybutadiene is essentially insoluble in the presence of high cis-1,4-polyisoprene as a dispersing agent. The liquid nonaqueous dispersion medium in which these dispersions are prepared must be a very poor solvent for the high cis-1,4-polybutadiene that is dispersed therein.

Some representative examples from which this medium can be selected include n-butane, isobutane, n-pentane, isopentane, neopentane, and isobutylene, and mixtures or combinations of any or all of these hydrocarbons. Standard nickel catalyst systems for the synthesis of very high cis-1,4-polybutadiene can be used in this polymerization technique.

This invention discloses a process for the nonaqueous dispersion polymerization of butadiene monomer in a reaction mixture containing a liquid nonaqueous dispersion medium, the improvement which comprises carrying out the polymerization of the butadiene monomer in the presence of high cis-1,4-polyisoprene to produce very high cis-1,4-polybutadiene.

DETAILED DESCRIPTION

Butadiene can be polymerized to a very high (95% or greater) cis-1,4-polybutadiene in a nonaqueous liquid dispersion medium containing high cis-1,4-polyisoprene. The nonaqueous medium in which this polymerization is run must be a very poor solvent for very high cis-1,4-polybutadiene. Some representative examples of nonaqueous media that can be employed in which the very high cis-1,4-polybutadiene is essentially insoluble include: n-butane, isobutane, n-pentane, isopentane, neopentane, 2-methylpentane, 2,2-dimethylbutane, 2,2-dimethylpentane, 2,4-dimethylpentane, 2,2,4-trimethylpentane, 2,2,3-trimethylbutane, isobutylene, 1-butene, 3-methyl-1-butene, trans-2-butene and any mixture of any or all of these nonaqueous media. Minor amounts of other hydrocarbons, which by themselves are solvents for very high cis-1,4-polybutadiene, can also be present in such a nonaqueous dispersion media; however, their presence is detrimental since even small amounts of solvent will cause swelling of the cis-1,4-polybutadiene and result in an increase in viscosity. The presence of large amounts of solvents for cis-1,4-polybutadiene will lead to the formation of a cement-like composition. Since it is desirable for these nonaqueous dispersions to have a very low viscosity it is advantageous to minimize the amount of solvents for cis-1,4-polybutadiene in the nonaqueous medium.

The liquid nonaqueous dispersion media should contain less than about 5% aromatic and cycloaliphatic hydrocarbons (which are good solvents for cis-1,4-polybutadiene) such as, benzene, toluene, cyclohexane, methylcyclohexane and the like. The nonaqueous medium must contain less than about 20% aliphatic hydrocarbons that are fair solvents for high cis-1,4-polybutadiene in order to be effective as a nonaqueous medium in the polymerization of high cis-1,4-polybutadiene. Some representative examples of such aliphatic hydrocarbons include: hexane, 3-methylpentane, 2,3-dimethylbutane, heptane, octane, 2,3-dimethylpentane, and 2,3,4-trimethylpentane.

Most olefins react too rapidly with the alkylaluminum catalysts that can be used in these polymerizations and/or are too good as solvents for the very high cis-1,4-polybutadiene to be useful as a nonaqueous dispersion media. Some olefins that are an exception to this general rule include trans-2-butene, isobutylene, 1-butene and 3-methyl-1-butene which can be used with good success as a nonaqueous dispersion media. Fluorohydrocarbons can also be used very successfully as the nonaqueous dispersion media for the synthesis of very high cis-1,4-polybutadiene. Some representative examples of fluoro-hydrocarbons that can be employed as the nonaqueous dispersion media include 1,1,1,2,2-pentafluoropropane, decafluorobutane, octafluorobutane and the like.

Several factors are important in selecting the preferred medium for the nonaqueous dispersion polymerization of very high cis-1,4-polybutadiene. If the medium has a very low boiling point, it is necessary to operate the system at a relatively high pressure and/or while utilizing considerable refrigeration to maintain a low temperature. If the medium has a relatively high boiling point, more energy is required to recover and/or remove the last traces of the medium from the polymer. Other things being equal, the dispersed particles will stay dispersed or suspended slightly better in a high density medium than it will in a medium having a relatively low density. One of the most important factors in selection of a preferred nonaqueous medium is the relative solvency of the medium for the very high cis-1,4-polybutadiene and for the dispersing agent.

The relative solvency factor is related to the solubility parameter, which is the square root of the cohesive energy density, that is, $$\text{Solubility Parameter} = \sqrt{\frac{\Delta E}{V}}$$

where $\Delta E$ is internal energy and $V$ is the molar volume. A good medium in which to polymerize butadiene to very high cis-1,4-polybutadiene should have a solubility parameter between about 6 and about 7 $(cal/cc)^{\frac{1}{2}}$ as reported by Kenneth L. Hoy in "New Values of the Solubility Parameters from Vapor Pressure Data," Journal of Paint Technology, vol. 42, no. 541, pp. 76-118 (1970). This article is incorporated herein by reference in its entirety.

The preferred media are n-butane, n-pentane, iso-pentane, 2-methylpentane, 2,2-dimethylpentane, 2,2,4-trimethylpentane, and any mixtures of two or more of these media.

It is essential to employ high cis-1,4-polyisoprene as a dispersing agent in this nonaqueous polymerization of butadiene into very high cis-1,4-polybutadiene. The amount of high cis-1,4-polyisoprene which must be present in order to produce nonaqueous dispersions for very high cis-1,4-polybutadiene can range between about 2.5 and about 15 parts by weight per 100 parts of butadiene monomer (phm) used in the polymerization. The preferred range for the amount of high cis-1,4-polyisoprene which can be employed is between 4 and 10 phm.

In high cis-1,4-polyisoprene at least 70% of the isoprene units in the polymer have the cis-1,4-isomeric structure. It is preferred to employ very high cis-1,4-polyisoprene as the dispersing agent in these nonaqueous polymerizations. In very high cis-1,4-polyisoprene at least 95% of the isoprene units in the polymer have the cis-1,4-isomeric structure.

High cis-1,4-polyisoprene from a number of sources can be used as the dispersing agent. Both synthetic and naturally occurring high cis-1,4-polyisoprenes will function as nonaqueous dispersing agents in this polymerization process. For examples, high cis-1,4-polyisoprene prepared utilizing alkyllithium catalysts, such as butyllithium, can be employed. Some representative examples of some commercially available very high cis-1,4-polyisoprenes include Natsyn TM 200 and Natsyn TM 2200 (marketed by The Goodyear Tire & Rubber Company). Some representative examples of natural high cis-1,4-polyisoprene rubbers that can be used as nonaqueous dispersion agents in this polymerization process include Clitandra orientalis, Ficus elastica, Landolphia species, Parthenium argentatum (guayule), Hevea brasilienis, and the like.

The high cis-1,4-polyisoprenes used in this nonaqueous polymerization should have a number average molecular weight weight, as determined using a permeable membrane osmometer, ranging between about 50,000 and about 1,000,000 or higher. Expressed in terms of inherent viscosity determined at a concentration 0.5 weight percent in toluene at 30° C., the high cis-1,4-polyisoprenes should be within the range of about 1 to about 12 dl/g and preferably in the range between 2 and 8 dl/g.

The reaction mixture utilized in the nonaqueous dispersion polymerization of butadiene to produce a very high cis-1,4-polybutadiene is comprised of a liquid nonaqueous dispersion medium, high cis-1,4-polyisoprene, butadiene monomer, and a catalyst system. Such a polymerization can be run over a temperature range from 0° C. up to 100° C. Most generally, it is preferred to utilize a reaction temperature from 35° C. to 70° C. The reaction time required in such a polymerization will vary with the reaction temperature utilized, catalyst system, and catalyst level. Generally, this reaction time will vary from about 20 minutes up to about 30 hours. Commonly, it will be preferred to utilize a reaction time from about 1 up to about 6 hours.

The amount of butadiene monomer that can be utilized in such a nonaqueous dispersion polymerization reaction mixture can be varied from about 3 to about 30 weight percent based upon the total reaction mixture. It is preferred to have a concentration of butadiene monomer ranging from 10 to 25 percent by weight based upon the total reaction mixture. The amount of high cis-1,4-polyisoprene required as a dispersing agent in this nonaqueous polymerization can vary from about 2.5 to about 15 phm. It is preferred to employ from 4 to 10 phm of high cis-1,4-polyisoprene. It is desirable to conduct this polymerization in an oxygen and moisture free environment. For example, it is desirable to sparge the reaction mixture with dry nitrogen and to run the polymerization under a dry nitrogen atmosphere. The pressure in the reaction system during the polymerization generally will be a function of the polymerization temperature, the butadiene monomer concentration, and the boiling point of the nonaqueous dispersion medium. This polymerization pressure will usually be within the range between 100,000 Pa (Pascal) and 500,000 Pa.

The catalyst systems used in this nonaqueous dispersion polymerization to prepare very high cis-1,4-polybutadiene are ternary systems comprised of an organoaluminum compound, a soluble nickel containing compound, and a fluorine containing compound. The organoaluminum compound used is usually a trialkylaluminum; a dialkylaluminum hydride, or a dialkylaluminum fluoride. The preferred organoaluminum compounds include triethylaluminum (TEAL), tri-n-propylaluminum, triisobutylaluminum (TIBAL), trihexylaluminum, diisobutylaluminum hydride (DIBA-H), and diethylaluminum fluoride. Some representative examples of organonickel compounds that can be utilized include nickel benzoate, nickel naphthenate, nickel 2-ethylhexanoate which is commonly referred to as nickel octanoate or nickel octoate (NiOct), nickel neodecanoate, nickel acetylacetonate, and nickel salicylaldehyde. Some representative examples of fluorine containing compounds that can be utilized include boron trifluoride ($BF_3$), hydrogen fluoride, boron trifluoride diethyl etherate complex, boron trifluoride di-n-butyl etherate complex, boron trifluoride phenolate complex, boron trifluoride benzaldehyde complex, boron trifluoride ethyl benzoate complex, hydrogen fluoride diethyl ether complex, and hydrogen fluoride di-n-butyl ether complex.

The catalysts and the procedure for preparing very high cis-1,4-polybutadiene while utilizing nickel catalyst systems are described in U.S. Pat. Nos. 3,170,907, 3,483,177 and 3,856,764. All of the foregoing references are hereby incorporated by reference in their entirety. The catalyst components can be charged "in situ," premixed in the absence of any monomer, "preformed" by premixing in the presence of a minor amount of butadiene monomer, or premixed in the presence of certain polymers such as polybutadiene.

This nonaqueous dispersion polymerization can be run by simply adding the catalyst components to a nonaqueous dispersion medium which contains butadiene monomer and high cis-1,4-polyisoprene to form the reaction mixture. During the course of the polymerization it will generally be desirable to provide some form of agitation to the reaction mixture, such as stirring, shaking, or tumbling. A shortstopping agent may be employed to terminate the polymerization after the desired reaction time or at the desired degree of polymerization. Antioxidants can also be added to these nonaqueous dispersions of very high cis-1,4-polybutadiene.

The nonaqueous dispersions formed in this polymerization process have concentrations of very high cis-1,4-polybutadiene generally ranging between about 14 and 20 weight percent which are quite fluid and permit greatly improved heat transfer in comparison to that occurring with the very viscous, highly swollen polybutadiene cement of similar concentrations produced when using solution polymerization techniques. Due to the relative fluidity of these nonaqueous dispersions, the concentration of dispersed very high cis-1,4-polybutadiene in the medium can be increased by 25 to 60% over the maximum allowable concentrations in solution polymerization techniques. This is achieved while maintaining adequate fluidity and heat transfer. Therefore, the production capacity of a given polymerization reactor can be greatly increased. The viscosity of the nonaqueous dispersion will increase sharply as the concentration of very high cis-1,4-polybutadiene in the dispersion increases. The viscosity of the dispersion also will increase as the molecular weight of the very high cis polybutadiene increases.

A further advantage of using this nonaqueous dispersion polymerization technique is that the polymerization medium can be recovered and used directly for further polymerizations without the usual steam stripping, distillation, and drying since the dispersed particles can be removed by centrifuging, sedimentation or filtration.

For example, a nonaqueous dispersion can be mixed with about 1 phr of dibutyl-p-cresol and a trace of methanol (0.1 to 0.5% by weight) and then charged into a rotary drum vacuum filter where the bulk of the liquid nonaqueous dispersion medium can be removed and pumped to a premix makeup tank where fresh butadiene can be added for utilization in further polymerizations. The filter cake of very high cis-1,4-polybutadiene can then be removed mechanically and/or by using a reverse flow of an inert gas or nitrogen to help dislodge the polymer from the filter cloth. The drying of the filter cake can be completed by passing it through a tunnel dryer or an expeller and extruder dryer.

An alternative method of recovering the solid high cis-1,4-polybutadiene from the nonaqueous dispersion medium is by centrifuging. For example, an automatic batch centrifuge can be employed. Separation by sedimentation followed by removal (pumping off) of the supernatant liquid can also be used. However, this is generally a much slower and less effective process.

A portion of the liquid nonaqueous dispersion medium from either the filtration, centrifugation or sedimentation operations will generally have to be distilled in a fractionating column before it is returned to the premix makeup tank for use in additional polymerizations. This is in order to prevent buildup of excessive amounts of impurities in the recycled dispersion medium. Distillation of 15 to 25% by weight of the recycle medium normally will suffice although the amount will depend upon operating conditions.

Such a nonaqueous dispersion can also be processed in a manner similar to that customarily utilized in solution polymerization techniques, where the "cement" is mixed with water and steam which coagulate the polymer and vaporize the solvent and unreacted monomer. This is a very energy intensive process wherein water is removed from the "crumb" rubber in a dewatering tank and trough, a water expeller, and an extruder dryer. Several other variations in centrifuging, filtration and sedimentation operations are described by W. L. McCabe and J. C. Smith in *Unit Operations of Chemical Engineering*, third Edition, McGraw-Hill Chemical Engineering Series, Chapter 30, pages 922–972 (1976). This article is incorporated herein by reference in its entirety.

DESCRIPTION OF THE PREFERRED EMBODIMENTS

This invention is illustrated by the following examples which are merely for the purpose of illustration and are not to be regarded as limiting the scope of the invention or manner in which it may be practiced. Unless specifically indicated otherwise, parts and percentages are given by weight. Inherent viscosities were determined at a concentration of 0.5 weight percent in toluene at 30° C.

Brookfield viscosities for the dispersions were determined at 25° C. using a Brookfield viscometer Model LVF manufactured by Brookfield Laboratories, Inc. The very high cis-1,4-polybutadiene samples were separated from the nonaqueous mediums by air drying on drying trays followed by vacuum drying to constant weight.

EXAMPLES 1 THROUGH 7

A butadiene in n-pentane solution was passed down a column containing silica gel, and measured quantities of the solution were charged into a series of 4 ounce (118 ml) bottles. The solutions were sparged with dry nitrogen after which they contained about 9 grams of butadiene per 100 milliliters of solution. Aliquots of a colloidal suspension/solution of a synthetic, very high (96%) cis-1,4-polyisoprene (IR) in n-pentane containing 1.6 g of polyisoprene per 100 milliliters were added to all except one of the 4-ounce (118 ml) bottles. The catalyst components were charged by "in situ" addition in the following order: (1) triethylaluminum (TEAL), (2) nickel naphthenate (NiNaph) and (3) boron trifluoride-dibutyl etherate complex ($BF_3.Bu_2O$). The bottles were capped, placed in a constant temperature water bath at 50° C. and tumbled end-over-end for about four hours. The amounts of catalyst charged and the results obtained are summarized in Table I.

The very high cis-1,4-polyisoprene produced in Example 1, which contained no high cis-1,4-polyisoprene as a nonaqueous dispersing agent, was almost completely insoluble in the pentane media and a nonaqueous dispersion was not formed. It formed a few small balls of polymer but most of it plated out as a coating on the wall of the bottle. In those experiments were polyisoprene was added a milky, nonaqueous dispersion (NAD) formed within 20 to 30 minutes at 50° C. Good dispersions existed while they were agitated, but the dispersed particles partially settled while standing. For example, the top 20 volume percent of the contents in the bottle in Example 6 was a clear supernatant liquor while the lower 80% was dispersion after standing for 16 hours. The top 75% of the contents in Example 2 was a clear liquor while the lower 25% contained almost all of the solid particles. The contents in the bottles in Examples 2, 6 and 7 redispersed readily when shaken, but those in Examples 3 through 5 required vigorous shaking in order to obtain partial redispersion. As can be determined by examining Table I, the quality of the nonaqueous dispersions formed improves with increasing concentrations of the dispersing agent (very high cis-1,4-polyisoprene) employed. The weight percent (wt.%) yield of very high cis-1,4-polybutadiene was also determined for these examples. An excellent yield of 96% was obtained in Example 6. The dilute solution viscosity for each of the polymers synthesized was determined at a concentration of 0.5 weight percent in toluene at 30° C.

TABLE I

| Example | IR, phm[1] | Catalyst, mhm[2] | | | Appearance | Yield Wt % | DSV[3], dl/g |
|---|---|---|---|---|---|---|---|
| | | TEAL | NiNaph | $BF_3.Bu_2O$ | | | |
| 1 | 0 | 1 | 0.075 | 1.6 | Plated Out | 63 | ND[4] |
| 2 | 5 | 1 | 0.075 | 1.6 | Fair NAD | 80 | 3.8 |
| 3 | 3 | 2 | 0.15 | 3.2 | Poor NAD | 92 | 3.4 |
| 4 | 3 | 3 | 0.15 | 4.5 | Poor NAD | 86 | 2.8 |
| 5 | 3 | 3 | 0.075 | 4.5 | Poor NAD | 92 | ND |
| 6 | 7.5 | 2 | 0.10 | 3.8 | Good NAD | 96 | 2.5 |
| 7 | 10 | 2 | 0.10 | 3.8 | Good NAD | 89 | 2.6 |

[1] parts/100 parts monomer
[2] millimoles/100 grams of monomer
[3] Dilute solution viscosity
[4] Not determined

EXAMPLE 8

A nonaqueous dispersion of very high cis-1,4-polybutadiene was synthesized as described in Example 2 with the catalyst system used containing 1.0 mhm (millimoles per 100 grams of monomer) TEAL, 0.075 mhm NiNaph, and 1.6 mhm boron trifluoride di-n-butyl etherate complex ($BF_3.Bu_2O$). A good nonaqueous dispersion was produced in 4 hours and the polymer yield was 76% of the theoretical weight. The very high cis-1,4-polybutadiene produced had a dilute solution viscosity (DSV) of 3.0 dl/g, which was determined by using the technique described in Examples 1 through 7.

EXAMPLE 9

Very high cis-1,4-polybutadiene was synthesized using the technique described in Example 8 except that no polyisoprene was added as a dispersing agent. The polybutadiene produced plated onto the wall of the bottle. The bottle was removed from the 50° C. bath after three hours, and 5 phm of cis-1,4-polyisoprene was added. The bottle and its contents were returned to the 50° C. bath and tumbled end-over-end for an additional 16 hours. No dispersion was formed and the polybutadiene coating was not affected by the addition of the polyisoprene after the polybutadiene had been prepared. The yield of polybutadiene was 84%. This example indicates that for best results the high cis-1,4-polyisoprene must be added to the reaction mixture used in the polymerization either before the polymerization is started or very shortly thereafter. It also indicates that a nonaqueous dispersion of very high cis-1,4-polybutadiene cannot be made by the addition of high cis-1,4-polyisoprene after the very high cis-1,4-polybutadiene has been produced in the polymerization.

EXAMPLES 10 THROUGH 13

A series of butadiene in n-pentane solutions were prepared in 4 ounce (118 ml) bottles as specified in Examples 1 through 7. Additional liquid butadiene (BD) monomer was transferred from a separate bottle by means of a two-way stopcock and hypodermic syringe needles in increasing amounts to each of four bottles. The amount of BD added was determined by the increase in weight. The total amount of BD charged to each bottle is listed in the second column of Table II. Four phm of a colloidal solution of synthetic high cis-1,4-polyisoprene and each of the three catalyst components were injected "in situ" through the cap liners into each of the bottles. The catalysts employed were 1.5 mhm of TEAL, 0.075 mhm of NiOct, and 2.7 mhm of $BF_3.Bu_2O$. The polymerizations were conducted at 50° C. for 18 hours. The results are summarized in Table II. The approximate weight percent of very high cis-1,4-polybutadiene in pentane is shown in Column 5. The Brookfield viscosities shown in column 7 were determined using a #2 spindle in Examples 10 and 11, and a #3 spindle in Example 12, at 30 rpm with viscosities being given in centipoise (cps). The Brookfield viscosity for Example 13 was not determined (ND).

TABLE II

| Example | BD, g Total | Yield wt % | DSV Dl/g | wt % polymer | Appearance | Brookfield, cps |
|---|---|---|---|---|---|---|
| 10 | 13 | 91 | 3.8 | 20 | NAD, fluid | 175 |
| 11 | 15 | 94 | 3.9 | 22 | NAD, moderately viscous | 725 |

TABLE II-continued

| Example | BD, g Total | Yield wt % | DSV Dl/g | wt % polymer | Appearance | Brookfield, cps |
|---|---|---|---|---|---|---|
| 12 | 16.4 | 95 | 3.9 | 24 | NAD, viscous | 1850 |
| 13 | 21.2 | 100 | 3.7 | 30 | NAD, viscous slug | ND |

The Brookfield viscosities of the dispersions in pentane increased as the polybutadiene concentration increased, but they were still quite low relative to the viscosities of polybutadiene cements formed in solution polymerizations.

EXAMPLES 14 AND 15

The same procedure that was utilized in Examples 10 through 13 was employed except that hexane was used in place of pentane and no dispersing agent was added. Hexane is an aliphatic hydrocarbon that is a fair solvent for high cis-1,4-polybutadiene. The results are summarized in Table III. A #4 spindle was used at 30 rpm in Example 14 and at 12 rpm in Example 15 in order to determine Brookfield viscosities.

TABLE III

| Example | BD, g Total | Yield wt % | DSV dl/g | wt % polymer | Appearance | Brookfield cps |
|---|---|---|---|---|---|---|
| 14 | 10.5 | 97 | 2.5 | 14.7 | Viscous cement | 11,000 |
| 15 | 14.1 | 98 | 2.7 | 21.0 | Very viscous cement | 40,200 |

A comparison between Examples 11 and 15, which contain 22 and 21 weight percent very high cis-1,4-polybutadiene respectively, shows that the Brookfield viscosity of the nonaqueous dispersion formed in Example 11 is only 725 cps while the polymer solution formed in Example 15 has a Brookfield viscosity of 40,200 cps. Using this nonaqueous dispersion polymerization technique the production capacity of a polymerization reactor can be greatly increased over the capacity that is possible using solution polymerization since much higher polymer concentrations are allowable while maintaining adequate fluidity.

EXAMPLE 16

A nonaqueous dispersion (NAD) of very high cis-1,4-polybutadiene in pentane was prepared utilizing the procedure described in Examples 1 through 7, except that the nickel containing compound used in this experiment was nickel neo-decanoate (NiDec) rather than nickel naphthenate. The dispersing agent was 4.5 phm of synthetic very high (96%) cis-1,4-polyisoprene; the catalyst system used was 1.0 mhm TEAL, 0.1 mhm NiDec, and 1.6 mhm $BF_3.Bu_2O$. The polymerization was conducted at 50° C. for 1.5 hours. A fairly good nonaqueous dispersion was produced. The yield of dried polymer was 72 weight percent and it had a DSV of 3.3 dl/g.

EXAMPLES 17 THROUGH 23

A series of butadiene in n-pentane solutions were prepared in a series of bottles as specified in Examples 1 through 7 except that 5 different polyisoprenes were used as dispersing agents. These polyisoprenes which had been prepared by utilizing different amounts of butyllithium (BuLi) as the catalyst in their polymerization in order to obtain a series of polymers which had different molecular weights (DSV's ranged from 0.7 to 4.6 dl/g) were dissolved in pentane to produce solutions containing about 2 to 2.5 weight percent polyisoprene in pentane. Aliquots of these polyisoprene solutions were added to the bottles, and then the catalysts were injected "in situ" in the amounts shown in Table IV. The microstructures of the polyisoprenes utilized as nonaqueous dispersing agents were determined by nuclear magnetic resonance (n.m.r.) and/or infrared methods. The m.m.r. method used is described in Beebe, D. H., Polymers, Vol. 29, p. 231 (1978), which is hereby incorporated by reference in its entirety.

The BuLi prepared polyisoprene which had a DSV of 0.7 dl/g and a microstructure of about 65 to 70% cis-1,4-, 25 to 20% trans-1,4-and 10 to 12% 3,4-polyisoprene never produced a dispersion of the high cis-1,4-polybutadiene in Example 17. The addition of 8 to 10 phm of polyisoprenes which had DSV's in the range between 2.5 to 4.6 dl/g and about 71 to 88% cis-1,4-, 18 to 8% trans-1,4- and 9 to 4% 3,4-polyisoprene produced fairly good dispersions of the polybutadiene in Examples 21, 22 and 23.

Although the dispersed particles settled upon standing until they occupied about 50 percent of the total volume, they redispersed when they were shaken. The presence of 5 phm of the BuLi prepared polyisoprenes was insufficient to produce dispersions after the butadiene conversion was more than about 50 percent.

The polymerizations in Examples 17, 22, and 23 were run for 3.5 hours and the polymerizations in Examples 18 through 21 were run for 18 hours.

TABLE IV

| Example | IR[1] DSV | IR[1] phm | Catalyst, mhm TEAL | Catalyst, mhm NiOct | Catalyst, mhm $BF_3$ | Yield, wt % | Dispersion Appearance |
|---|---|---|---|---|---|---|---|
| 17 | 0.7 | 8 | 1.0 | 0.075 | 1.6 | 86 | Plated on glass |
| 18 | 1.8 | 5 | 1.0 | 0.05 | 2.0 | 94 | Plated out |
| 19 | 1.8 | 10 | 1.5 | 0.05 | 1.8 | 99 | Poor; out at 2 hr. |
| 20 | 2.5 | 5 | 1.5 | 0.05 | 3.0 | 93 | Poor; out at 2 hr. |
| 21 | 2.5 | 10 | 1.5 | 0.05 | 3.0 | 95 | Good; settled |
| 22 | 3.4 | 8 | 1.0 | 0.07 | 1.6 | 88 | Good; settled |
| 23 | 4.6 | 8 | 1.0 | 0.07 | 1.6 | 96 | Fair to Good |

[1]IR — isoprene rubber (polyisoprene)

EXAMPLE 24

A butadiene in n-pentane solution was prepared in a 4 ounce (118 ml) bottle as specified in Examples 1 through 7. 7.5 parts of very high cis-1,4-polyisoprene per 100 g of butadiene monomer was added as a 2.3 weight percent colloidal suspension/solution in pentane. The catalyst components added in this example were 1.5 mhm of triisobutylaluminum (TIBAL), 0.075 mhm of NiOct, and 4.2 mhm of hydrogen fluoride dibutyl etherate complex ($HF.Bu_2O$). The sealed bottle was tumbled in a constant temperature bath at 50° C. for 19 hours. A good nonaqueous dispersion was formed and the polymer yield was 68 weight percent. The Brookfield viscosity of the nonaqueous dispersion, which contained about 7.5 weight percent of very high cis-1,4-polybutadiene, was determined to be 3 cps using a #1 spindle at 30 rpm.

EXAMPLES 25 THROUGH 27

A series of butadiene in n-pentane solutions were prepared in a series of bottles as specified in Examples 1 through 7. Guayule rubber, which had a DSV of 4.6 dl/g, was used as the dispersing agent. The catalyst components used were TEAL, NiOct, and $BF_3.Bu_2O$; and the molar ratio of TEAL to NiOct to $BF_3.Bu_2O$ was 1.0 to 0.05 to 1.9. In Example 26, the catalysts were charged prior to the guayule, and this difference in the order of addition had no effect. The nonaqueous dispersion medium used in Example 27 was approximately 82 volume percent pentane and 18 volume percent hexane. The polymerizations were run at 50° C. for the time shown in Column 4 of Table V. The amount of guayule used as a dispersing agent is shown in Column 2 of Table V. Brookfield viscosities were determined using a #2 spindle at 30 rpm.

TABLE V

| Example | Guayule phm | Catalyst, phm | Time, Hrs | Brookfield Viscosity, cps | Polymer Yield, wt % | DSV, dl/g |
|---|---|---|---|---|---|---|
| 25 | 5 | 0.52 | 18 | ND | 81 | 2.8 |
| 26 | 7.5 | 1.04 | 5 | 95 | 95 | 2.5 |
| 27 | 7.5 | 0.78 | 18 | 226 | 92 | 2.7 |

The presence of guayule resulted in the formation of excellent nonaqueous dispersions. A few particles coalesced while standing for 24 hours, but they did not settle.

While certain representative embodiments and details have been shown for the purpose of illustrating the invention, it will be apparent to those skilled in this art that various changes and modifications may be made therein without departing from the scope of the invention.

What is claimed:

1. A process for the nonaqueous dispersion polymerization of butadiene monomer in a reaction mixture containing a liquid nonaqueous dispersion medium, the improvement which comprises carrying out the polymerization of the butadiene monomer in the presence of high cis-1,4-polyisoprene to produce very high cis-1,4-polybutadiene.

2. A process as specified in claim 1 wherein said high cis-1,4-polyisoprene is very high cis-1,4-polyisoprene.

3. A process as specified in claim 1 wherein said high cis-1,4-polyisoprene is present in an amount between about 2.5 and about 15 parts per hundred parts of said butadiene monomer by weight.

4. A process as specified in claim 3 wherein said high cis-1,4-polyisoprene is present in an amount between 4 and 10 parts per hundred parts of said butadiene monomer by weight.

5. A process as specified in claim 1 wherein said butadiene monomer is present in said reaction mixture at a concentration from about 3 to about 30 weight percent based upon the total reaction mixture.

6. A process as specified in claim 5 wherein said butadiene monomer is present in said reaction mixture at a concentration from about 10 to about 25 weight percent based upon the total reaction mixture.

7. A process as specified in claim 1 wherein said liquid nonaqueous dispersion medium is at least one member selected from the group consisting of n-butane, isobutane, n-pentane, isopentane, neopentane, 2,2-dimethylbutane, 2,2,-dimethylpentane, 2,4-dimethylpentane, 2,2,4-trimethylpentane, 2,2,3-trimethylbutane, isobutylene, 1-butene, 3-methyl-1-butene, trans-2-butene, 2-methylpentane, 1,1,1,2,2-pentafluoropropane, decafluoropentane, and octafluorobutane.

8. A process as specified in claim 7 wherein said liquid nonaqueous dispersion medium is at least one member selected from the group consisting of n-butane, n-pentane, isopentane, 2-methylpentane, 2,2-dimethylpentane, and 2,2,4-trimethylpentane.

9. A process as specified in claim 1 wherein said high cis-1,4-polyisoprene has an inherent viscosity in the range between 2 and 8 dl/g.

10. A process as specified in claim 1 wherein said reaction mixture comprises a catalyst system comprised of at least one organoaluminum compound, at least one soluble nickel containing compound, and at least one fluorine containing compound.

* * * * *

UNITED STATES PATENT OFFICE
CERTIFICATE OF CORRECTION

PATENT NO. : 4,418,185
DATED : Nov. 29, 1983
INVENTOR(S) : Morford C. Throckmorton
Paul H. Sandstrom It is certified that error appears in the above-identified patent and that said Letters Patent are hereby corrected as shown below:

Column 8, line 23, please delete "cis-1,4-polyisoprene" and substitute therefor --cis-1,4-polybutadiene--

Column 11, line 11, please delete "m.m.r." and substitute therefor --n.m.r.--

Signed and Sealed this

First Day of January 1985

[SEAL]

Attest:

GERALD J. MOSSINGHOFF

Attesting Officer

Commissioner of Patents and Trademarks